United States Patent [19]
Sawayama

[11] Patent Number: 6,106,719
[45] Date of Patent: Aug. 22, 2000

[54] PROCESS FOR TREATING LIQUID WASTE USING LIGHT UNDER ANAEROBIC CONDITIONS

[75] Inventor: Shigeki Sawayama, Tsukuba, Japan

[73] Assignee: Director-General of Agency of Industrial Science and Technology, Japan

[21] Appl. No.: 09/392,665

[22] Filed: Sep. 9, 1999

[30] Foreign Application Priority Data

Sep. 14, 1998 [JP] Japan ................................. 10-259695

[51] Int. Cl.⁷ ....................................................... C02F 3/06
[52] U.S. Cl. ............................ 210/616; 210/601; 210/630; 210/903
[58] Field of Search ................................. 210/601, 602, 210/605, 610, 615–617, 630, 903

[56] References Cited

U.S. PATENT DOCUMENTS

| | | | |
|---|---|---|---|
| 4,351,729 | 9/1982 | Witt | 210/617 |
| 4,482,458 | 11/1984 | Rovel et al. | 210/61 |
| 4,532,042 | 7/1985 | Aivasidis et al. | 210/617 |
| 4,832,847 | 5/1989 | Fujii et al. | 210/616 |
| 5,116,505 | 5/1992 | Lourens et al. | 210/617 |

*Primary Examiner*—Thomas G. Wyse
*Attorney, Agent, or Firm*—Lorusso & Loud

[57] ABSTRACT

A process of treating a liquid waste containing organic matters, which includes contacting, in a digestion zone maintained in anaerobic conditions, the liquid waste with bacterial granules of (a) acid fermentation bacteria and/or methane-producing bacteria and (b) phototrophic bacteria, while irradiating the bacterial granules with light, to digest the organic matters and to proliferate the phototrophic bacteria.

5 Claims, 1 Drawing Sheet

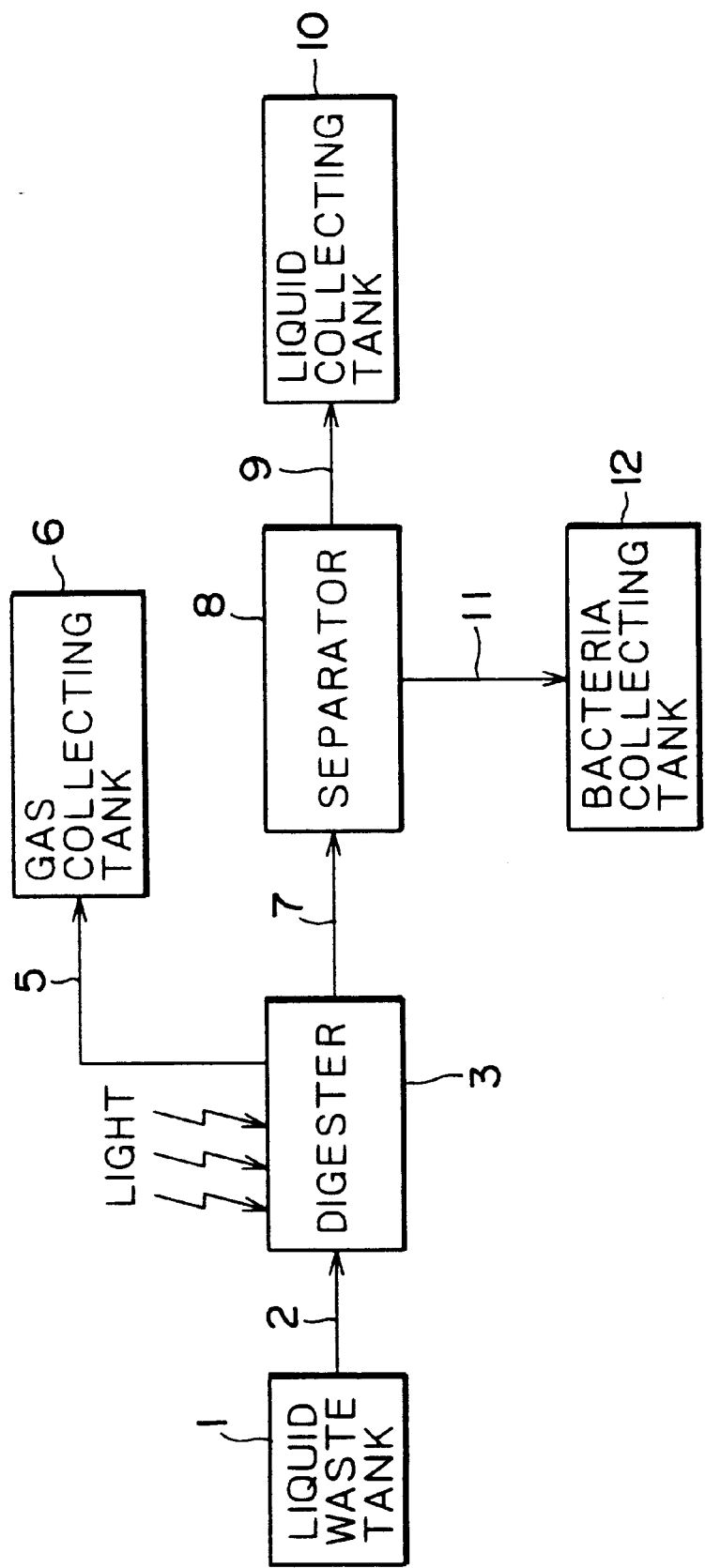

PROCESS FOR TREATING LIQUID WASTE USING LIGHT UNDER ANAEROBIC CONDITIONS

BACKGROUND OF THE INVENTION

This invention relates to a process of treating a liquid waste containing organic matters and nitrogen-and/or phosphorus-containing inorganic matters by anaerobic digestion of the organic matters.

Anaerobic digestion with fermentation bacteria and methane-producing bacteria has been hitherto used for treating waste water containing organic matters, because the process can be performed at low costs and can yield methane useful as an energy source. One problem of this process is that nitrogen- and/or phosphorus-containing inorganic matters which would cause eutrophication of sea, lake, etc. are hardly treated.

JP-B-H7-96118 discloses a method of treating a waste water in a reactor having a packed bed of ceramic carrier particles supporting thereon phototrophic bacteria and methane-producing bacteria. The waste water is passed through the packed bed in the reactor maintained under anaerobic conditions, while irradiating the packed bed with light. This method has a problem because a large amount of bacteria cannot be supported on the ceramic carrier and because nitrogen compounds are not efficiently removed. Additionally, the use of the carrier requires an increased cost.

Phototrophic bacteria are useful for the production of hydrogen and valuable chemical compounds such as raw materials for biodecomposable plastics and oleic acid. Further, phototrophic bacteria may be utilizable as fodder and fertilizer. Thus, there is a great demand for techniques for proliferating phototrophic bacteria in an economical manner.

SUMAMRY OF THE INVENTION

It is, therefore, an object of the present invention to provide a simple and economical process which can efficiently treat a liquid waste containing both organic matters and nitrogen- and/or phosphorus-containing inorganic matters using a combination of bacteria.

Another object of the present invention is to provide a process which can efficiently culture and produce phototrophic bacteria using a liquid waste.

It is a further object of the present invention to provide a process of the above-mentioned type which can be performed without using a support or carrier for the bacteria.

In accomplishing the foregoing object, the present invention provides a process of treating a liquid waste containing organic matters, comprising contacting, in a digestion zone maintained in anaerobic conditions, the liquid waste with bacterial granules comprising (a) acid fermentation bacteria and/or methane-producing bacteria and (b) phototrophic bacteria, while irradiating the bacterial granules with light, to digest said organic matters and to proliferate the phototrophic bacteria.

BRIEF DESCRIPTION OF THE DRAWINGS

Other objects, features and advantages of the present invention will become apparent from the detailed description of the preferred embodiments of the invention which follows, when considered in light of the accompanying drawings, in which FIG. 1 is a flow chart schematically illustrating an apparatus suitable for carrying out the process according to the present invention in a continuous manner.

DETAILED DESCRIPTION OF THE PREFERRED EMBODIMENTS OF THE INVENTION

The liquid waste to be treated in accordance with the process of the present invention may be a waste water discharged from homes, restaurants, food factories and fermentation factories. Waste and garbage discharged from homes, restaurants, food factories and fermentation factories and sludge derived from urbane and industrial waste water treatment may also be treated by the process of the present invention after being dispersed or dissolved in water. Such liquid wastes generally contain nitrogen- and/or phosphorus-containing inorganic matters as well as organic matters.

In the present invention (a) acid fermentation bacteria and/or methane-producing bacteria and (b) phototrophic bacteria are used in combination for anaerobic digestion of the liquid waste.

Acid fermentation bacteria can produce organic acids by anaerobic digestion of organic matters such as peptides, sugars and fatty acids. Methane-producing bacteria can convert organic matters into methane by anaerobic digestion. These bacteria are well known in the art.

Phototrophic bacteria include purple non-sulfur bacteria, purple sulfur bacteria and green sulfur bacteria. Typical examples of strains of phototrophic bacteria include *Chrorobium limicola*, *Chromatium vinosum*, *Rhodopseudomonas palustris* and *Rhodobastor capsulatus*.

It is important that the above bacteria should be in the form of granules. By this expedience, the density of the bacteria, namely the amount of bacteria per unit volume, is much increased as compared with the carrier-supported bacteria or suspended non-granular bacteria, so that the consumption efficiency and proliferation efficiency are much improved in the present invention. Additionally, the bacterial granules can easily separated from the digested liquid waste.

The bacterial granules may be obtained by co-culturing (a) acid fermentation bacteria and/or methane-producing bacteria and (b) phototrophic bacteria in an upflow anaerobic sludge bed-type reactor for a period of time sufficient to form aggregates consisting essentially of the bacteria. The bacterial granules preferably have an average particle size of 0.5–5 mm, more preferably 2–3 mm, in the state where they are immersed in the liquid waste to be treated.

The treatment of the liquid waste containing organic matters is performed by contacting the liquid waste with the bacterial granules in a digestion zone maintained in anaerobic conditions, while irradiating the bacterial granules with light. Through this treatment, the organic matters are digested efficiently with the simultaneous proliferation of the phototrophic bacteria. The growth of the phototrophic bacteria is accelerated because of the light irradiation and the presence of nitrogen- and/or phosphorus-containing compounds as nutrients.

In the digestion zone, the granules are preferably present in an amount of 3–60% by weight, more preferably 40–50% by weight, based on the weight of a total weight of the granules and the liquid waste to be treated. The treatment is generally carried out at a temperature of 10–100° C., preferably 30–40° C. The light may be sunlight or radiation from an artificial lamp and may generally have a wavelength of 400–1,100 nm and an intensity providing an exposure energy of 1–2,000 $\mu E/m^2/s$, preferably 50–200 $\mu E/m^2/s$. Irradiation of the mixture may be continuous or intermittent. Because gases including methane are produced by digestion, the bacterial granules moves up and down. Therefore, it is not necessary to mechanically stir the contents in the reaction zone.

Referring now to FIG. 1, designated as 1 is a tank storing a liquid waste to be treated. The liquid waste is continuously fed through a line 2 to a digester 3 in which bacterial granules are contained and which is maintained under anaerobic conditions. The digester 3 has a light permeable portion through which the contents in the digester 3 are irradiated with sunlight or light from a lamp. Thus, the liquid waste is digested with the phototrophic bacteria being proliferated. A gas such as methane produced by the anaerobic digestion is continuously discharged through a line 5 and collected in a tank 6. The gas generally has a composition of 50–100 mole % of methane, 0–50 mole % of $CO_2$ and 0–10 mole % of $H_2$.

The treated liquid waste is continuously discharged through a line 7 from the digester 3 and is introduced into a liquid-solid separator 8, such as a filtration device, a centrifuge or a sedimentation tank, where the treated liquid waste is separated into a liquid phase and a solid-rich phase in the form of a slurry or a wet cake. The liquid phase is fed through a line 9 to a liquid tank 10, while the solid-rich phase is fed through a line 11 to a storage tank 12. The solid-rich phase includes the phototrophic bacteria proliferated in the digester 3. The content of the phototrophic bacteria in the solid phase (after drying) is generally 0.005–0.1% by weight. The liquid phase has an organic matter content of less than ⅕ that of the feed liquid waste.

The following examples will further illustrate the present invention.

EXAMPLE

Granules (530 g; average particle size: 2–3 mm) of acid fermentation bacteria, methane-producing bacteria and phototrophic bacteria were placed in a 850 ml glass vessel having a light permeable side wall together with 320 ml of a liquid to be treated (Liquid W) having a composition shown in Table 1 below.

TABLE 1

Composition of Liquid W

| Ingredients | Amount (mg/liter) |
| --- | --- |
| Sodium acetate | 2,500 |
| Sodium lactate | 1,250 |
| Sodium propionate | 1,250 |
| Yeast extract | 300 |
| EDTA-Fe | 30 |
| $CaCl_2 \cdot 2H_2O$ | 25 |
| $MgCl_2 \cdot 6H_2O$ | 25 |
| $CoCl_2 \cdot H_2O$ | 5 |
| $MnCl_2 \cdot 4H_2O$ | 5 |
| $KH_2PO_4$ | 16 |
| $NH_4Cl$ | 200 |
| Dissolved organic carbon content | 1,484 |
| Ammonia content (as N) | 53.9 |
| Phosphoric acid content (as P) | 3.7 |
| pH: | 7.0 |

Then, the same liquid (Liquid W) was continuously fed for 26 days to the glass vessel at a feed rate of 600 ml per day, while continuously discharging a digestion liquid therefrom to maintain the amount of the contents therein constant. The vessel was maintained at 35° C. under anaerobic conditions throughout the treatment. At the beginning of the third day, irradiation of light through the light permeable side wall was started using an incandescent lamp. Thus, the contents in the vessel were continuously irradiated with the light (intensity: 100 $\mu E/m^2/S$ on the surface of the liquid in the vessel). The irradiation was, however, stopped whole days on the 14th, 20th and 21st days.

The digesting liquid obtained each day was measured for the concentration of phototrophic bacteria by specrophotometry (in terms of absorbancy at 865 nm), dissolved organic carbon content (Ct), ammonia content as N ($NH_4$), phosphoric acid content as P (P), and dissolved oxygen content. Also, the gas product collected each day was measured for its volume (Gas) and methane yield ($CH_4$). The results are summarized in Table 2. The dissolved oxygen content of the digestion liquid obtained in each day was found to be zero.

TABLE 2

| Digestion liquid collected | Absorbancy (865 nm) | Ct (mg/l) | $NH_4$ (mgN/l) | P (mgP/l) | Gas (ml/d) | $CH_4$ (ml/d) |
| --- | --- | --- | --- | --- | --- | --- |
| Liquid W | — | 1,484 | 53.9 | 3.7 | — | — |
| 1st day | 0.140 | 105 | 50.7 | 3.8 | 628 | 548 |
| 2nd day | 0.204 | 97 | 50.7 | 3.0 | 571 | 494 |
| 3rd day | 0.120 | 186 | 51.9 | 3.8 | 630 | 539 |
| 4th day | 0.193 | 166 | 62.5 | 4.8 | 667 | 586 |
| 5th day | 0.105 | 115 | 64.5 | 6.5 | 352 | 573 |
| 6th day | 0.350 | 40 | 54.9 | 1.9 | 573 | 528 |
| 8th day | 0.739 | 49 | 40.3 | 2.2 | 815 | 756 |
| 9th day | 0.796 | 42 | 45.1 | 1.5 | 533 | 494 |
| 10th day | 0.752 | 43 | 43.0 | 1.2 | 628 | 583 |
| 11th day | 0.780 | 54 | 43.5 | 0.9 | 609 | 546 |
| 13th day | 0.682 | 56 | 41.7 | 0.9 | 581 | 523 |
| 14th day* | 0.256 | 51 | 52.6 | 2.7 | 600 | 540 |
| 15th day | 0.748 | 50 | 41.9 | 1.5 | 800 | 741 |
| 16th day | 0.918 | 49 | 39.6 | 0.9 | 438 | 408 |
| 17th day | 0.899 | 50 | 36.2 | 1.2 | 505 | 470 |
| 18th day | 0.798 | 50 | 32.1 | 1.0 | 409 | 385 |
| 19th day | 0.686 | 52 | 32.7 | 1.2 | 1143 | 1044 |
| 20th day* | 0.278 | 53 | 49.8 | 2.2 | 746 | 682 |
| 21st day* | 0.271 | 39 | 53.3 | 2.8 | 400 | 369 |
| 22nd day | 0.588 | 40 | 34.4 | 1.0 | 311 | 287 |
| 23rd daV | 0.663 | 48 | 37.4 | 1.0 | 124 | 116 |
| 24th day | 0.510 | 43 | 37.9 | 1.2 | 171 | 159 |
| 25th day | 0.444 | 46 | 38.2 | 1.2 | 267 | 246 |
| 26th day | 0.571 | 55 | 31.1 | 1.8 | 945 | 868 |

*Light irradiation was not carried out whole day.

The absorbancy at 865 nm of the digestion liquid is specific to bacteriochlorophyl induced by the proliferation of the phototrophic bacteria. The results shown in Table 2 indicate that the phototrophic bacteria are much proliferated when the anaerobic digestion is carried out while irradiating the bacterial granules with light. It is also appreciated that digestion of the organic matters and nitrogen- and phosphorus-containing inorganic matters is enhanced by light irradiation.

To improve the digestion efficiency in an early stage of the continuous digestion, phototrophic bacteria and other bacteria can be incorporated into the liquid phase to be treated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process of treating a liquid waste containing organic matters, comprising contacting, in a digestion zone maintained in anaerobic conditions, the liquid waste with bacterial granules comprising (a) acid fermentation bacteria and/ or methane-producing bacteria and (b) phototrophic bacteria, while irradiating the bacterial granules with light, to digest said organic matters and to proliferate the phototrophic bacteria.

2. A process as claimed in claim 1, further comprising discharging the contacted liquid waste containing the proliferated phototrophic bacteria from said digestion zone; and separating the discharged liquid waste into a solid-rich phase containing the proliferated phototrophic bacteria and a liquid phase.

3. A process as claimed in claim 1, wherein the liquid waste contains nitrogen- and/or phosphorus-containing inorganic matters.

4. A process as claimed in claim 1, wherein the bacterial granules have an average particle size of 0.5–5 mm.

5. A process as claimed in claim 2, wherein said liquid waste is continuously fed to said digestion zone with the contacted liquid waste being continuously discharged therefrom.

* * * * *